United States Patent
Dieron et al.

(10) Patent No.: US 7,375,914 B1
(45) Date of Patent: May 20, 2008

(54) DISK DRIVE WITH IMPROVED METHOD FOR OPERATING A THERMAL HEAD FLY-HEIGHT ACTUATOR

(75) Inventors: Roel Dieron, San Jose, CA (US); Ryohheita Hattori, San Jose, CA (US); Satyajit Neelkanth Patwardhan, Fremont, CA (US); Christopher David Wiederholt, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/679,794

(22) Filed: Feb. 27, 2007

(51) Int. Cl.
*G11B 21/02* (2006.01)

(52) U.S. Cl. ....................................... 360/75
(58) Field of Classification Search ................. 360/75, 360/69, 31, 55, 128
See application file for complete search history.

(56) References Cited

U.S. PATENT DOCUMENTS

| | | | |
|---|---|---|---|
| 5,021,906 A | 6/1991 | Chang et al. | |
| 5,130,866 A | 7/1992 | Klaassen et al. | |
| 5,276,573 A | 1/1994 | Harada et al. | |
| 5,828,644 A * | 10/1998 | Gage et al. ............ | 369/112.24 |
| 5,991,113 A | 11/1999 | Meyer et al. | |
| 6,344,949 B1 | 2/2002 | Albrecht et al. | |
| 6,570,730 B1 | 5/2003 | Lewis et al. | |
| 6,611,399 B1 | 8/2003 | Mei et al. | |
| 6,775,103 B2 | 8/2004 | Kang et al. | |
| 6,947,242 B2 | 9/2005 | Seing et al. | |
| 7,023,647 B2 | 4/2006 | Bloodworth et al. | |
| 7,046,473 B2 * | 5/2006 | Fu et al. ...................... | 360/75 |
| 7,119,990 B2 * | 10/2006 | Bajorek et al. ............. | 360/128 |
| 2005/0024775 A1 | 2/2005 | Kurita et al. | |
| 2006/0023331 A1 | 2/2006 | Flechsig et al. | |
| 2006/0092570 A1 | 5/2006 | Payne et al. | |
| 2006/0138789 A1 * | 6/2006 | Yang ........................... | 360/75 |
| 2006/0158768 A1 | 7/2006 | Tanabe | |
| 2007/0030593 A1 * | 2/2007 | Hiroyuki et al. ............ | 360/128 |
| 2008/0043363 A1 * | 2/2008 | Yamashita et al. ............ | 360/75 |

* cited by examiner

*Primary Examiner*—Fred Tzeng
(74) *Attorney, Agent, or Firm*—Thomas R. Berthold

(57) ABSTRACT

A disk drive has a resistive heater located near the read/write head as a thermal fly-height actuator and uses an improved method for operating the fly-height actuator. As part of the method, the heater may be deactivated during a seek to minimize the risk of head-disk contacts. When a write command is received, a level of heater power is applied to pre-heat the write head prior to writing the initial data sectors. This pre-heating heater power level may be higher than the power level used for writing. Then when writing commences, the lower power level is applied to the heater so the write head has the optimal head-disk spacing during the writing of all the data sectors, including the initial data sectors. Even though the heater may be deactivated during the seek the controller can initiate pre-heating during the last portion of the seek before the write head has reached the target track.

13 Claims, 6 Drawing Sheets

DISK DRIVE WITH IMPROVED METHOD FOR OPERATING A THERMAL HEAD FLY-HEIGHT ACTUATOR

BACKGROUND OF THE INVENTION

1. Field of the Invention

This invention relates to magnetic recording disk drives, and more particularly to disk drives that have a fly-height actuator for controlling the spacing between the read/write head and the disk.

2. Description of the Related Art

Magnetic recording hard disk drives use a read/write transducer or head mounted on a head carrier for reading and/or writing data to the disk. The head carrier is typically an air-bearing slider attached to an actuator arm by a suspension and positioned very close to the disk surface by the suspension. There are typically a stack of disks in the disk drive with a slider-suspension assembly associated with each disk surface in the stack.

The separation or spacing between the head and the disk surface is called the fly-height. The slider has a disk-facing air-bearing surface (ABS) that causes the slider to ride on a cushion or bearing of air generated by rotation of the disk. The slider is attached to a flexure on the suspension and the suspension includes a load beam that applies a load force to the slider to counteract the air-bearing force while permitting the slider to "pitch" and "roll". The flying dynamics of the slider and thus the fly-height are influenced by factors such as the rotation speed of the disk, the aerodynamic shape of the slider's ABS, the load force applied to the slider by the suspension, and the pitch and roll torques applied to the slider by the suspension.

Disk drives have been proposed that use a fly-height actuator for changing the spacing between the head and the disk surface. One type of fly-height actuator is a thermal actuator with an electrically-resistive heater located on the slider near the head. When current is applied to the heater the heater expands and causes the head to expand and thus move closer to the disk surface.

Disk drives with thermal fly-height actuators typically adjust the fly-height depending on the radial location, i.e., the data track, where the head is reading or writing data. This is typically accomplished by determining the optimal head-disk spacing for each of a plurality of radial bands of data tracks during manufacturing, and then storing a set of control signal values in the disk drive. During operation of the disk drive the data track where data is to be read or written is identified, and the appropriate control signal value is recalled and used to apply a corresponding level of heater power to the heater to set the head-disk spacing to the optimal value for the band in which the data track is located.

Even in the absence of heat to the heater, the write head experiences protrusion during a write operation as a result of heat from the write coil. Thus when conventional thermal fly-height control is applied during writing the first few data sectors of a continuous multiple-sector write may have a higher error rate than later-written data sectors because the write head is still at its ambient temperature and thus has no protrusion. This results in a higher-than-optimal flying height over these initial data sectors and thus weaker writability. Also, if the heater is activated during certain seeks (i.e., when the head is being moved from one data track to another data track), there may be a higher risk of head-disk contact, including head crashes that result in unrecoverable disk drive failure.

What is needed is a disk drive with a thermal fly-height actuator that has an improved method of operating the fly-height actuator.

SUMMARY OF THE INVENTION

The invention is a disk drive with a thermal fly-height actuator and an improved method for operating the fly-height actuator. The fly-height actuator is controlled by a controller that includes a processor and associated memory that includes program instructions for executing the improved method of operation. The memory also includes registers or look-up tables for read heater power values (HPVs) and write HPVs, with each HPV being associated with a read/write head and a band of data tracks. As part of the improved operating method, the heater may be deactivated during a seek, depending on the length of the seek, to minimize the risk of head-disk contacts. When a write command is received, the controller applies an HPV to the heater to pre-heat the write head prior to writing the initial data sectors. This HPV used for pre-heating may be a read HPV, which is a higher power level than the write HPV. Then when writing commences, the appropriate write HPV is applied to the heater so the write head has the optimal head-disk spacing during the writing of all the data sectors, including the initial data sectors. The pre-heating time required for the write head to protrude is known and determined during disk drive manufacturing. The seek time for the head-positioning actuator to move the write head from its current data track to the target data track where data is to be written is also known, so even though the heater may be deactivated during the seek the controller can initiate pre-heating during the last portion of the seek before the write head has reached the target track.

For a fuller understanding of the nature and advantages of the invention, reference should be made to the following detailed description taken together with the accompanying figures.

DETAILED DESCRIPTION OF THE INVENTION

Figure 1:
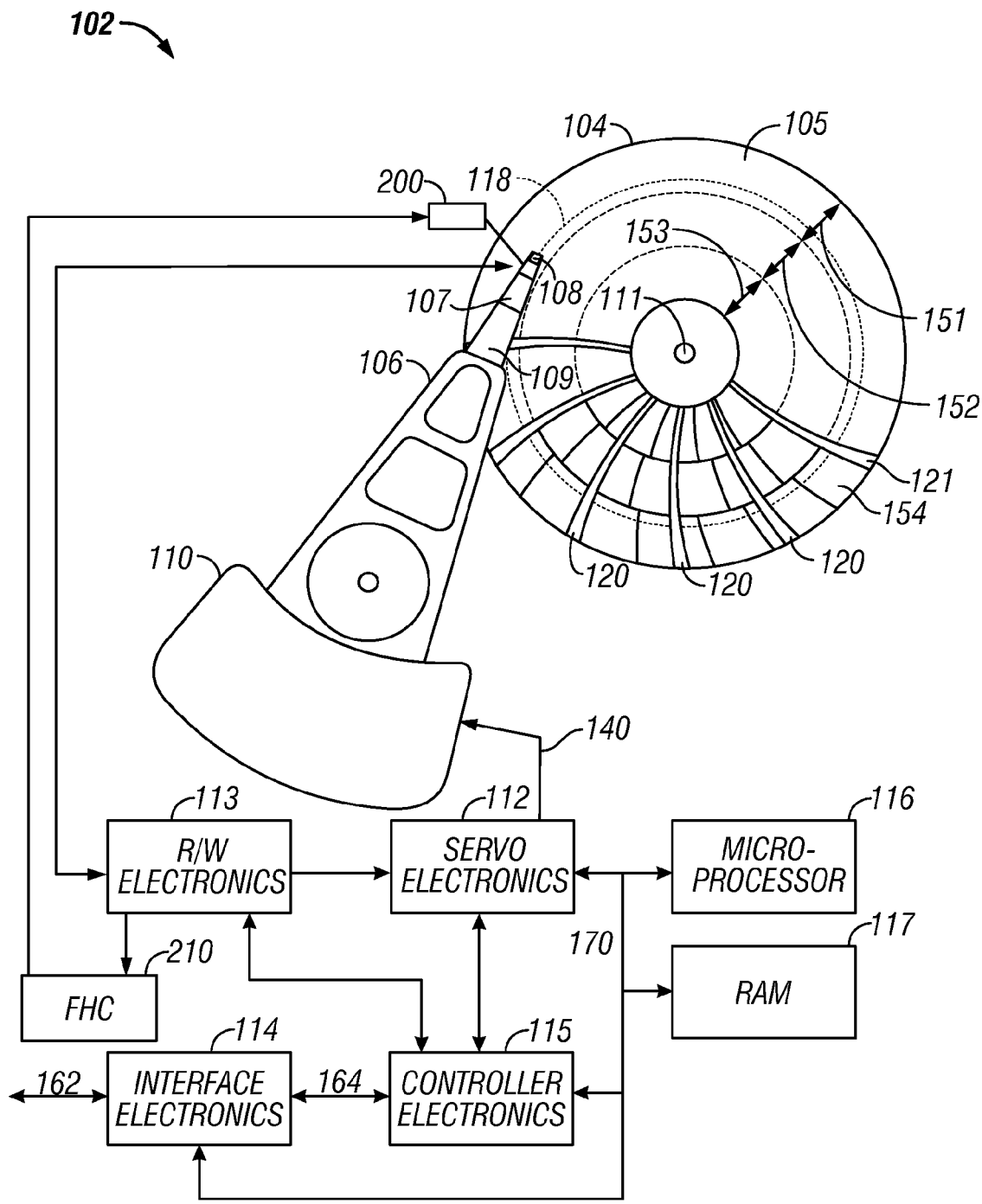
FIG. 1 is a schematic block diagram of a conventional magnetic recording disk drive of the type usable with this invention and having a fly-height actuator.

FIG. 1 is a block diagram of a conventional disk drive of the type usable with the present invention. The disk drive depicted is one that is formatted using a fixed-block "headerless" architecture with sector servo and zone-bit recording (ZBR), but the invention is applicable to disk drives using other types of data architectures and servo systems.

The disk drive, designated generally as 102, includes at least one data recording disk 104, a voice coil motor 110 actuator, an actuator arm 106, a suspension 109, a head carrier or slider 107, a data recording transducer 108 (also called a recording head or read/write head), servo electronics 112, read/write electronics 113, interface electronics 114, controller electronics 115, microprocessor 116, and RAM 117. The recording head 108 may be an inductive read/write head or a combination of an inductive write head with a magnetoresistive (MR) read head. The read/write 108 is typically located on a head carrier, such as an air-bearing slider 107 that has an air-bearing surface (ABS) facing the surface 105 of disk 104. The slider 107 is attached to the actuator arm 106 by a suspension 109 that allows the slider to "pitch" and "roll" with its ABS supported above but in close proximity to the surface 105 of rotating disk 104.

While only one head 108 and associated disk surface 105 are shown in FIG. 1, there are typically multiple disks stacked on a hub that is rotated by a disk motor, with a separate read/write head associated with each surface of each disk. Data recording disk 104 has a center of rotation 111, and is divided for head positioning purposes into a set of radially-spaced tracks, one of which is shown as track 118. The tracks are grouped radially into a number of zones or bands, three of which are shown as bands 151, 152 and 153. The 104 disk contains a plurality of servo sectors 120, which extend across the tracks in a generally radial direction. Each track has a reference index 121 indicating the start of track. Within each band, the tracks are also circumferentially divided into a number of data sectors 154 where user data is stored. In a "headerless" or "No-ID" data architecture, the data sectors contain no data sector identification (ID) fields for uniquely identifying the data sectors. If the disk drive has multiple heads, one head for each disk surface, as is typical, then the set of data tracks that are at the same radius on all disk data surfaces is referred to as a "cylinder".

Read/write electronics 113 receives signals from head 108, passes servo information from the servo sectors 120 to servo electronics 112, and passes data signals to controller electronics 115. Servo electronics 112 uses the servo information to produce a current at 140 which drives voice coil motor 110 to position the head 108 to the desired data track and to maintain it on the data track during reading and writing. Interface electronics 114 communicates with a host computer or system (not shown) over interface 162, passing data to the host. Interface electronics 114 also communicates with controller electronics 115 over interface 164, passing read and write commands to the controller electronics 115. Microprocessor 116 has associated memory, such as RAM 117, and communicates with the various other disk drive electronics over interface 170.

In the operation of disk drive 102, interface electronics 114 receives a request from the host for reading data from or writing data to a selected data sector or sectors 154. Controller electronics 115 receives a list of requested data sectors from interface electronics 114 and converts them into band, cylinder, head, and data sector numbers which uniquely identify the location of the desired data sectors. The head and cylinder information are passed to servo electronics 112, which is responsible for positioning the read/write head 108 over the appropriate data sector on the appropriate cylinder. If the cylinder number provided to servo electronics 112 is not the same as the cylinder number over which the head 108 is presently positioned, servo electronics 112 first executes a seek operation to reposition the head 108 to the appropriate cylinder.

Once servo electronics 112 has positioned head 108 over the appropriate cylinder, servo electronics 112 begins executing sector computations to locate and identify the desired data sector. As servo sectors 120 pass under head 108, the headerless architecture approach is used to identify each servo sector. In brief, a servo timing mark (STM) is used to locate servo sectors, and a count of STMs from a servo sector containing an index mark 121 uniquely identifies each servo sector. Additional information is maintained in association with servo electronics 112 and controller electronics 115 for controlling the reading or writing of data in the data sectors.

Figure 2A:
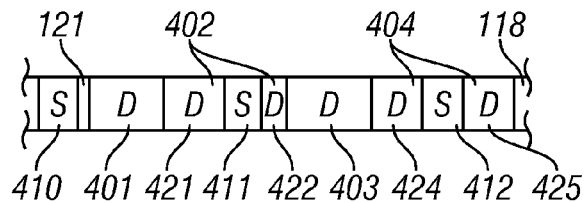
FIG. 2A is a portion of a typical data track showing four complete data sectors and three representative servo sectors.
Figure 2B:
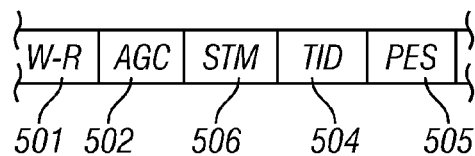
FIG. 2B is an expanded view of one of the servo sectors illustrated in FIG. 2A.

Referring now to FIG. 2A, a portion of a typical track 118 on the disk 104 is shown expanded. Four complete data sectors are shown (401, 402, 403 and 404). Three representative servo sectors 410, 411, and 412 are also shown. As can be seen from this example, some data sectors are split by servo sectors, and some data sectors do not start immediately following a servo sector. For example, data sectors 402 and 404 are split by servo sectors 411 and 412, respectively. Data sector 402 is split into data sections 421 and 422, and data sector 404 is split into data sections 424 and 425. Data sector 403 starts immediately after the end of data sector 402, rather than immediately following a servo sector. The index mark 121 indicates the beginning of the track and is shown contained in servo sector 410. FIG. 2B is an expanded view of one of the servo sectors illustrated in FIG. 2A. Typically, each servo sector contains an STM 506. The STM 506 serves as a timing reference for reading the subsequent servo information in track identification (TID) field 504 and position error signal (PES) field 505. The STM is sometimes also referred to as a servo address mark or servo start mark. The TID field 504 typically includes a servo sector number (SSN) for uniquely identifying the servo sector.

The disk drive shown in FIG. 1 also includes a fly-height actuator 200 for changing the spacing between read/write head 108 and the surface of disk 104. Fly-height actuator 200 is controlled by a fly-height controller (FHC) 210. In the preferred embodiment the fly-height actuator 200 is a thermal actuator located on slider 107.

Figure 3:
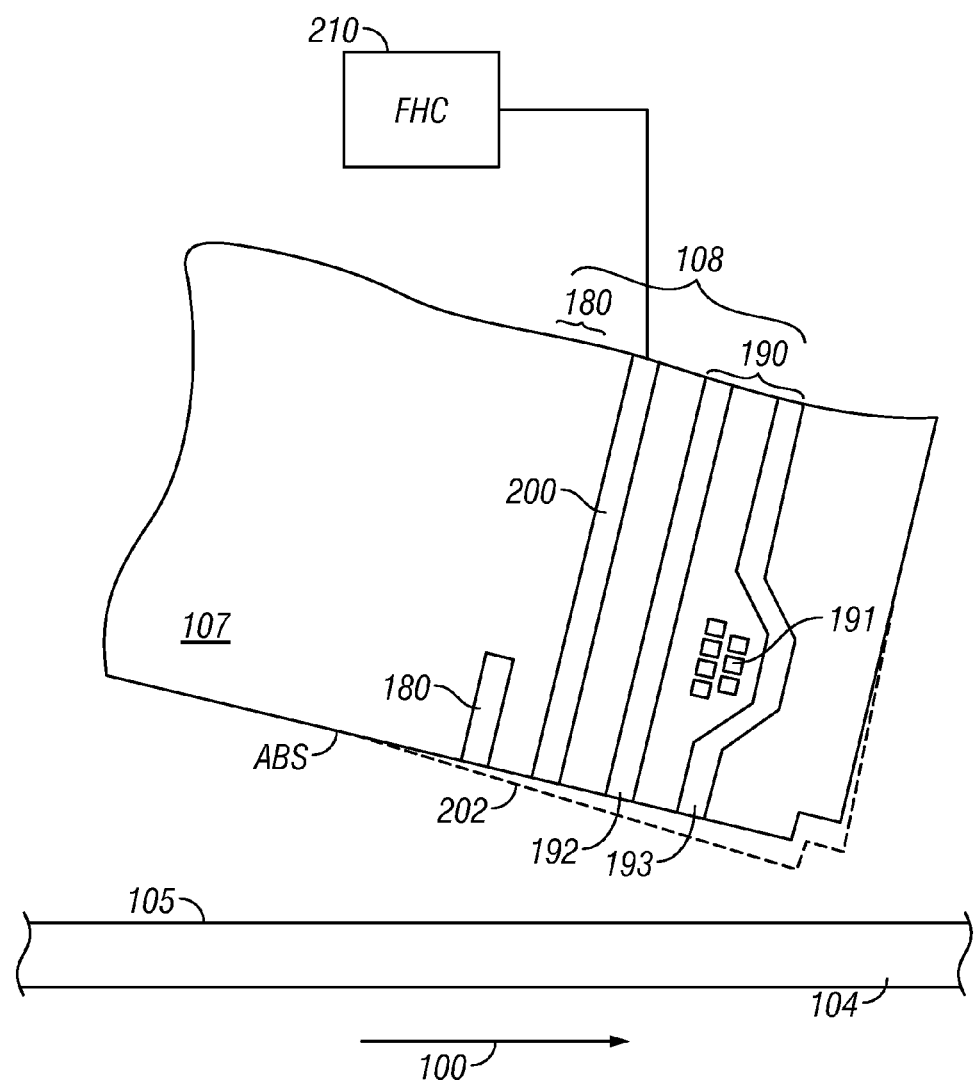
FIG. 3 is a sectional view of the end portion of an air-bearing slider above the surface of a disk and illustrates the thermal fly-height actuator, a read head and a write head on the slider.

FIG. 3 is a sectional view of the end portion of slider 107 above the surface 105 of disk 104 and shows the read/write head 108 and thermal fly-height actuator 200. The rotation of the disk 104 in the direction of arrow 100 generates an air bearing between the ABS of slider 107 and disk surface 105. During operation of the disk drive, the air bearing counterbalances the slight spring force of the suspension 109 (FIG. 1) and supports the slider 107 off and slightly away from the disk surface 105 by a small, substantially constant spacing. The read/write head 108 includes a MR read head 180 and write head 190. Write head 190 is an inductive write head with coil 191 located between the two write poles 192, 193. The write head 190 is depicted as a write head with two write poles for horizontal recording, but the write head may also be a perpendicular magnetic recording write head with a single write pole and one or more return poles.

The thermal fly-height actuator in FIG. 3 is an electrically-resistive heating element or heater 200 electrically connected to and controlled by FHC 210. FHC 210 is a power source that controls the amount of current to the heater 200, such as by controlling the settings of a variable resistor. As the current increases, the heater 200 expands and causes protrusion (PTR) of the head 108, as shown by the dashed line 202, which moves the MR read head 180 and pole tips 191, 192 of write head 190 closer to disk surface 105. The FHC 210 may include a temperature feedback control circuit that monitors the temperature of the heater 200 to maintain the fly-height of the head 108 within a desired range during operation of the disk drive.

A thermal fly-height actuator is described in U.S. Pat. No. 5,991,113 and published patent application US 2005/0024775 A1. U.S. Pat. No. 7,023,647 B2 describes a thermal actuator fly-height control circuit that may be implemented into the disk drive's MR head pre-amplifier circuit.

Figure 4:
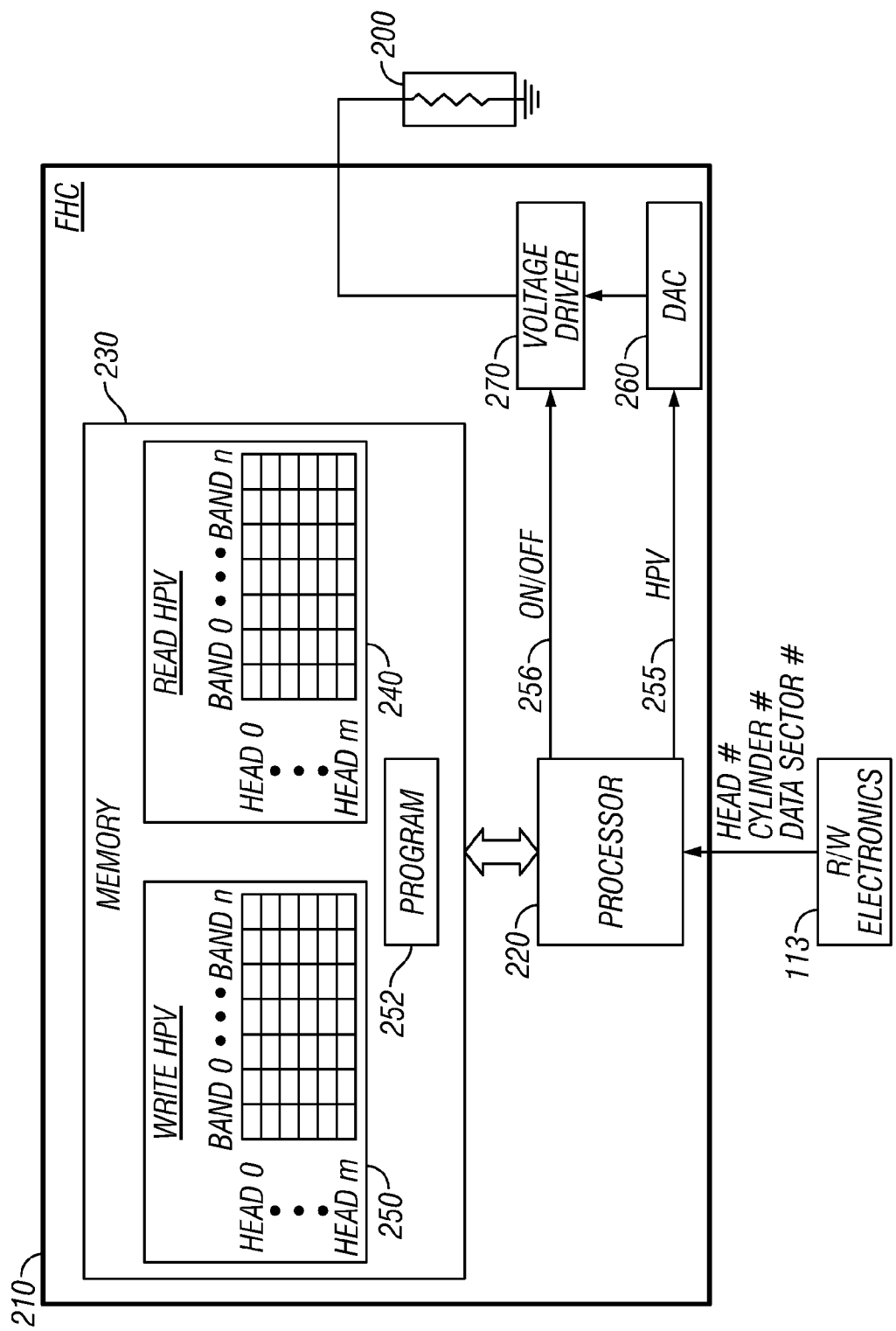
FIG. 4 is a high-level schematic of the fly-height controller according to this invention.

FIG. 4 is a high-level schematic of the FHC 210. FHC 210 includes a processor 220, associated memory 230 addressable by processor 220, a digital-to-analog converter (DAC) 260, and a voltage driver 270. The memory 230 includes a read fly-height control signal register 240 and a write fly-height control signal register 250. Register 240 stores a set of fly-height read control signal values to be used during reading. Each control signal value for a specific head and band is called a heater power value (HPV), so register 240 stores a set of Read HPVs to be used during reading. Similarly, register 250 stores a set of fly-height Write HPVs to be used during writing. Registers 240, 250 may be look-up tables that store Read HPVs and Write HPVs, respectively, for each head and band, as shown in FIG. 4 for a disk drive with m heads (corresponding to m disk surfaces) and n bands. During operation of the disk drive 102 (FIG. 1), the controller electronics 115 (FIG. 1) sends read and write commands to read/write electronics 113 to read or write data to a selected data track and sector or sectors. This information, specifically the head number, cylinder number and data sector number where data is to be read or written, is passed from read/write electronics 113 to processor 220 of FHC 210. Processor 220 uses the head number and the cylinder number (which identifies the band in which the selected data track is located), determines whether the command is to read or write, and recalls from memory 230 the appropriate Read HPV or Write HPV. This HPV is then passed on line 255 to DAC 260 which controls voltage driver 270. Voltage driver 270 is turned on or off at line 271 by a command from processor 220, which results in the heater 200 being activated or deactivated, respectively. If voltage driver 270 is on, it applies the current level corresponding to the HPV from DAC 260 to resistive heater 200 to achieve the desired heater power (Hp). This causes protrusion of the read/write head 108 (FIG. 3) to achieve the optimal head-disk spacing for reading or writing to the selected data sectors.

The HPVs in registers 240, 250 are stored as part of the disk drive manufacturing process. The relationship between head-disk spacing (d) and heater power (Hp) is determined for each head and disk surface combination, and is given generally by the following:

$$d=(\rho)[Hp(HDC)-Hp(d)] \quad \text{Equation (1)}$$

where ($\rho$) is the sensitivity of head-disk spacing to heater power (Hp) expressed as follows:

$$\rho=\Delta d/\Delta Hp \quad \text{Equation (2)}$$

and Hp(HDC) is the value of Hp that results in head-disk contact.

As part of the manufacturing process, each head in the disk drive is moved to each of the bands, and at each band measurements are made to determine overwrite (OW) and soft-error rate (SER) at various head-disk spacings. The OW and SER are well-known measurable parameters and are used to determine the optimal head-disk spacing d. For each of the determined values of d, the values of Hp are calculated and used to determine the HPVs that are then stored in registers 240, 250. As an alternative to the use of look-up tables for the HPVs, the optimal value of d for each band can be stored in memory 230, and the processor 220 can calculate HPV from equations (1) and (2) using computer program instructions stored in memory 230, as represented by program 252.

Figure 5:
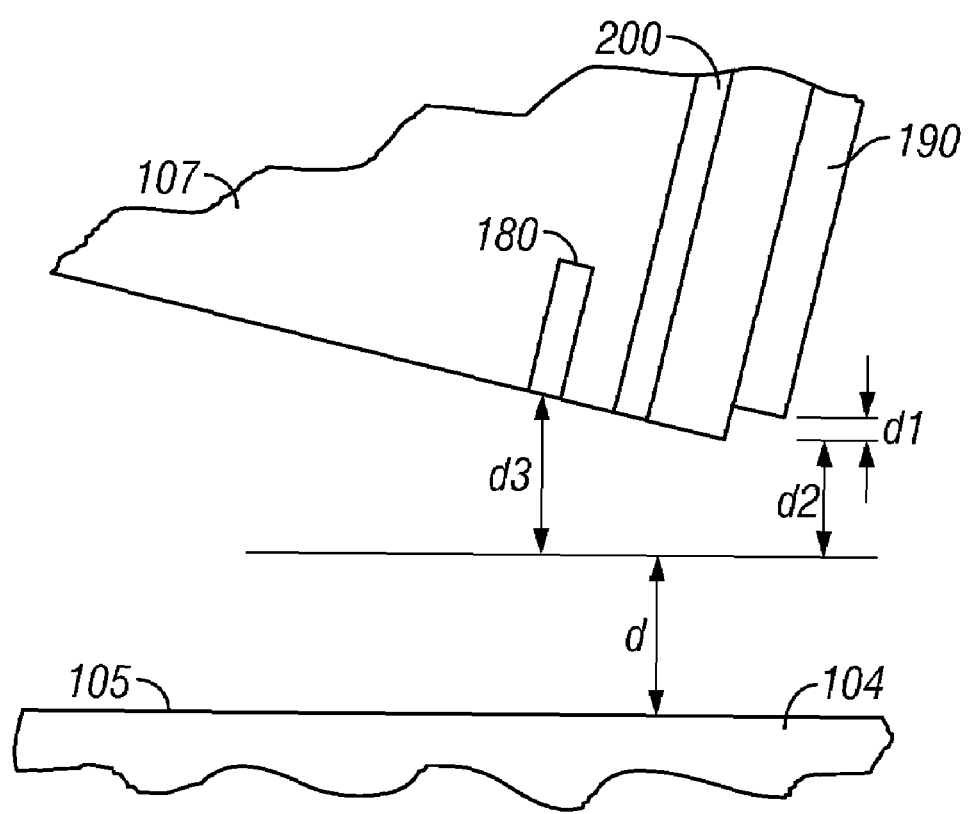
FIG. 5 is a sectional view of the end portion of an air-bearing slider above the surface of a disk and illustrates the relative changes in head-disk spacing for the read and write heads.

The above description is of a disk drive with thermal fly-height control in general, and a FHC 210 in particular, according to the prior art. The need for different HPVs for reading (register 240) and writing (register 250) is due to the fly-height difference caused by "write protrusion", which only happens during a write operation when heat from the write coil 191 (FIG. 3) causes some protrusion of the write pole tips 192, 193. This is shown schematically in FIG. 5 which is a sectional view of the end portion of slider 107, with read head 180 and write head 190, above the surface 105 of disk 104. During writing, without any application of heater power to heater 200, write head 190 protrudes a distance d1 closer to disk 104. Write head protrusion is a result of the thermal expansion of the write head 190 because of the heat from the high-frequency write current through the write coil. To optimize the head-disk spacing of write head 190, a Write HPV is applied to heater 200 as described above. This results in additional movement d2 of the write head 190. Thus for read head 180 to have approximately the same optimal head-disk spacing d, a Read HPV, greater than the Write HPV, is applied to heater 200 to cause movement of read head 180 a distance d3, where d3 is approximately d1+d2.

It has been discovered that the first few data sectors of a continuous multiple-sector write have a higher error rate than later-written data sectors. This is believed to be because the write head is still at its ambient temperature and thus has no protrusion. This results in a higher-than-optimal flying height over these initial data sectors and thus weaker writability. In this invention, the FHC 200 is used to pre-heat the write head prior to writing the initial data sectors. The use of heater 200 will cause the write head to protrude before writing the initial data sectors and make the fly height more uniform throughout the write. The pre-heating time required for the write head to protrude is known and determined during disk drive manufacturing. The seek time for the head-positioning actuator to move the write head from its current data track to the target data track where data is to be written is also known, so the processor can initiate pre-heating during a seek before the write head has reached the target track. For example, if the pre-heating time is 150 µs, this may correspond to approximately 4 tracks of an average-length seek.

It has also been discovered that there is a higher risk of head-disk contact, including head crashes that result in unrecoverable disk drive failure, if the heater is activated during seeks, especially long seeks. Thus in this invention, the heater is activated or de-activated depending on the length of the seek and whether the heater is already activated just prior to the seek.

Figure 6:
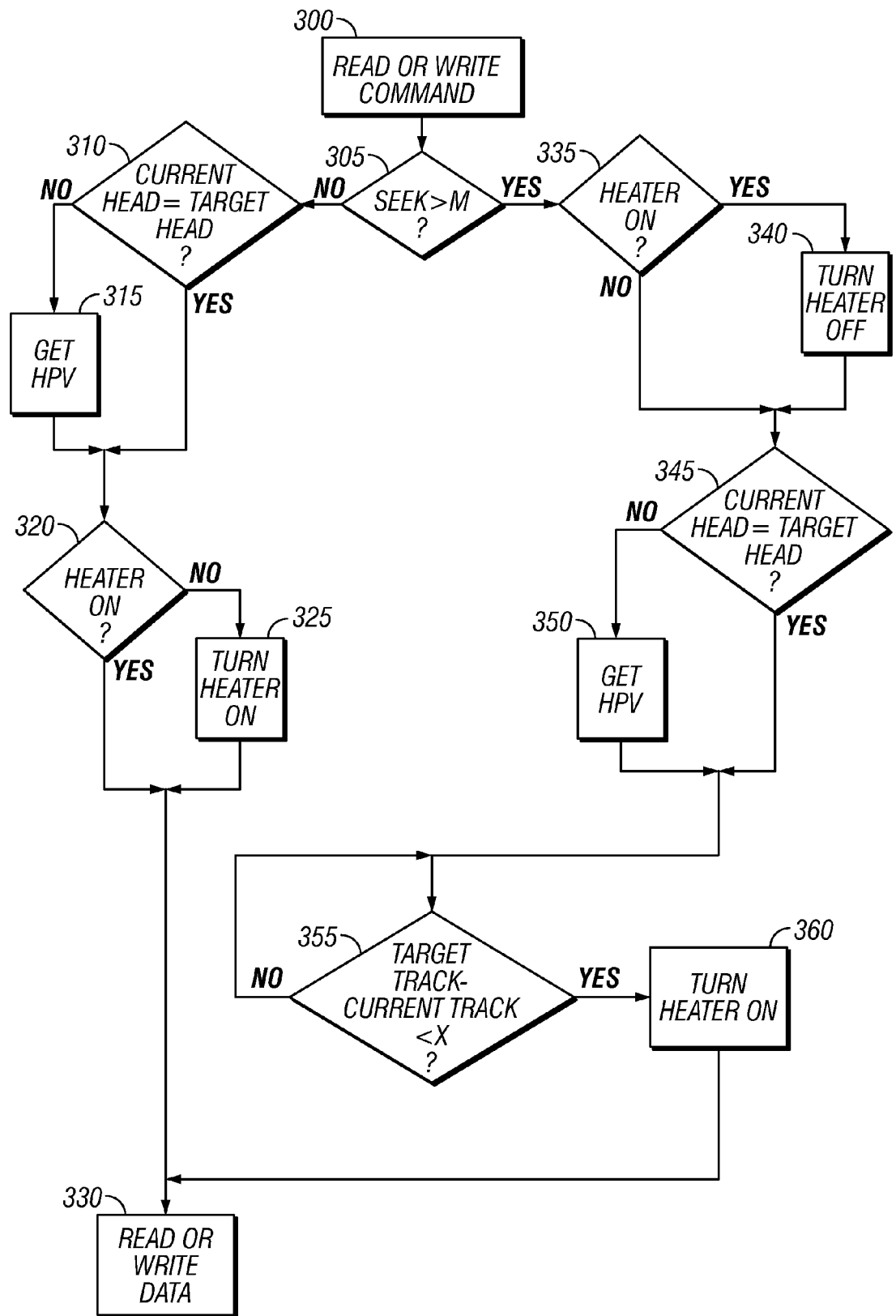
FIG. 6 is a flow chart illustrating the algorithms according to this invention.

FIG. 6 is a flow chart for the algorithms according to this invention, which can represent instructions in computer program 252 (FIG. 4) stored in memory 230 of FHC 210. At block 300, a command to read or write to target data sectors is received. At decision block 305 a determination is made whether the seek length (the difference between the target track and the current track) is greater than a predetermined number M of tracks, where M is determined during manufacturing as that distance where head-disk contact may occur if the heater remains on during the seek. If the seek length is less than M, then at block 310 a decision is made whether the current head number is the same as the target track head number, i.e., whether the target sectors are located on the current disk surface or another disk surface. If the target head number is different, then at block 315 the HPV corresponding to the target head (either the Read HPV or the Write HPV depending on whether the command at block 300 is a Read or a Write) is selected and applied to the heater. If at block 310 the target head number is the same as the current head number, then the correct HPV will already be selected. Next, at block 320 a determination is made whether the heater is on, and if it is off then it is turned on at block 325. The data is then read or written to the target sectors at block 330.

Referring back to block 305, if the seek length is greater than M, then the heater is turned off during the seek. At block 335 a determination is made whether the heater is on, and if it is on then it is turned off at block 340. Next, at block 345 a decision is made whether the current head number is the same as the target track head number. If the target head number is different, then at block 350 the HPV corresponding to the target head (either the Read HPV or the Write HPV depending on whether the command at block 300 is a Read or a Write) is selected. If at block 345 the target head number is the same as the current head number, then the correct HPV will already be selected. Next at block 355 the track number is checked during the seek. When the head is within a predetermined number X tracks of the target track, the heater is turned on at block 360. If the command at block 300 is a Write, then this pre-heats the write head so that protrusion has occurred when the head reaches the target sectors. The predetermined number X of tracks is determined from the known pre-heating time required for the write head and the known time it takes for the head to be moved across the tracks during a seek. If the command at block 300 is a Read, then the heater is also turned on at 360. Then when the head has reached the target sectors the data is written at block 330.

Figure 7:
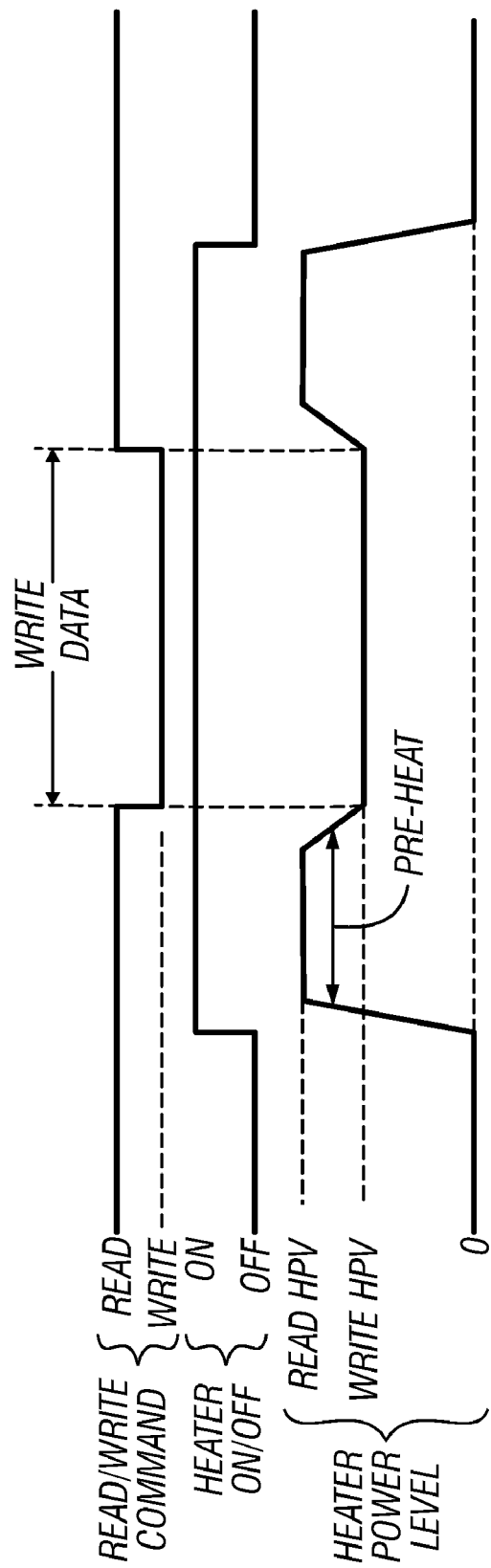
FIG. 7 is an illustration of the read and write heater power levels and the method for pre-heating the write head.

In the flow chart above, the HPV selected at block 350 is either a Read HPV or a Write HPV, depending on whether the command at block 300 is a read or a write. Thus if it is a write command, then at block 360 the HPV applied to the heater during pre-heating will be the Write HPV. However, at block 350, the HPV selected may instead be the Read HPV, regardless of whether the command is a read or a write. In that case the pre-heating power level to the write head will be at a higher level. Then, after the pre-heating time the HPV selected will be the Write HPV, which is a lower power level. This alternative approach is illustrated in FIG. 7.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:
1. A magnetic recording disk drive comprising:
a magnetic recording disk having a plurality of generally concentric data tracks, each of the data tracks having a plurality of angularly spaced data sectors;
an air-bearing slider maintained near the surface of the disk when the disk is rotating;
a read/write head on the slider for reading and writing data in the data tracks of the disk;
a data controller coupled to the head for selecting a data track and sector where data is to be read or written;
a head-positioning actuator for moving the slider and attached head to a selected data track;
a heater on the slider for changing the head-disk spacing;
a head fly-height controller coupled to the data controller and the heater for applying heater power to the heater to change the head-disk spacing, the fly-height controller including a processor and memory for storing a program of instructions readable by the processor for undertaking method acts including the method act of:
calculating, from the number of the data track where data is to be read or written, when to apply power to the heater.
2. The disk drive of claim 1 wherein the method act of calculating when to apply power to the heater includes the method acts of determining the current data track where the head is located and the target data track where data is to be read or written.
3. The disk drive of claim 2 wherein the method acts further comprise;
determining that the head-positioning actuator is moving the head to the target track; and
applying power to the heater when the head is within a predetermined number of tracks from the target track.
4. The disk drive of claim 2 wherein the method acts further comprise;
calculating the number of tracks between the current track and the target track to determine the seek length;
determining that the heater has power applied to it;
removing power to the heater if the seek length is greater than a predetermined value;
determining that the head-positioning actuator is moving the head to the target track; and
re-applying power to the heater when the head is within a predetermined number of tracks from the target track.
5. The disk drive of claim 1 wherein the method acts further comprise:
determining whether data is to be read from a data track or written to a data track; and
applying to the heater a read heater power value if data is to be read and a write heater power value different from said read heater power value if data is to be written.
6. The disk drive of claim 1 wherein the method acts further comprise;
determining that data is to be written to a target data sector;
determining that the heater does not have power applied to it;
applying a pre-heating level of power to the heater prior to the head reaching the target data sector; and
applying a write level of power to the heater when the head reaches the target data sector, said write level of power being less than said pre-heating level of power.
7. The disk drive of claim 1 wherein the concentric data tracks are arranged in a plurality of radially-spaced bands and wherein the memory includes heater power values stored in memory, each heater power value being associated with one of said bands and representing an optimal head-disk spacing for said associated band.

8. The disk drive of claim 1 wherein the heater power values are grouped into a set of read heater power values and a set of write heater power values.

9. A magnetic recording disk drive comprising:
a stack of magnetic recording disks, each disk having two disk surfaces, each disk surface having a plurality of generally concentric data tracks, each of the data tracks having a plurality of angularly spaced data sectors;
a plurality of air-bearing sliders, each slider maintained near an associated disk surface when the disk stack is rotating;
a plurality of read/write heads, each head being on an associated slider, for reading and writing data in the data sectors;
a data controller for selecting a target data track and sector where data is to be read or written and a head associated with said selected target data track;
a head-positioning actuator for moving the sliders and attached heads across their associated disk surfaces;
a plurality of heaters, each heater being on an associated slider for changing the head-disk spacing of the head on said associated slider;
a head fly-height controller coupled to the data controller and the heaters for applying heater power to the heaters to change the head-disk spacing, the fly-height controller including a processor and memory accessible by the processor, the memory including a set of read heater power values associated with the heads, a set of write heater power values associated with the heads, and a program of instructions readable by the processor for undertaking method acts of:
  determining from the data controller if data is to be written to the target data sector or read from the target data sector;
  determining from the data controller the number of the target data track and the selected head associated with the target data track;
  selecting, in response to said read or write determination and said selected head determination, a heater power value; and
  calculating, from the number of the target data track, when to apply said selected heater power value to the heater associated with said selected head.

10. The disk drive of claim 9 wherein the method acts further comprise;
  determining that the head-positioning actuator is moving the selected head to the target track; and
  applying said selected heater power value when the selected head is within a predetermined number of tracks from the target track.

11. The disk drive of claim 9 wherein the method acts further comprise;
  calculating the number of tracks between the current track and the target track to determine the seek length;
  determining that the associated heater has power applied to it;
  removing power to the associated heater if the seek length is greater than a predetermined value;
  determining that the head-positioning actuator is moving the selected head to the target track; and
  re-applying power to the associated heater when the selected head is within a predetermined number of tracks from the target track.

12. The disk drive of claim 9 wherein the method acts further comprise;
  determining that data is to be written to a target data sector;
  determining that the associated heater does not have power applied to it;
  applying a pre-heating level of power to the associated heater prior to the selected head reaching the target data sector; and
  applying a write level of power to the associated heater when the selected head reaches the target data sector, said write level of power being less than said pre-heating level of power.

13. The disk drive of claim 9 wherein the concentric data tracks are arranged in a plurality of radially-spaced bands and wherein each heater power value is associated with one of said bands.

* * * * *